Dec. 8, 1931.  G. VUILLE  1,835,830
MACHINE FOR MILLING BEARING BALLS
Filed March 12, 1930  5 Sheets-Sheet 4
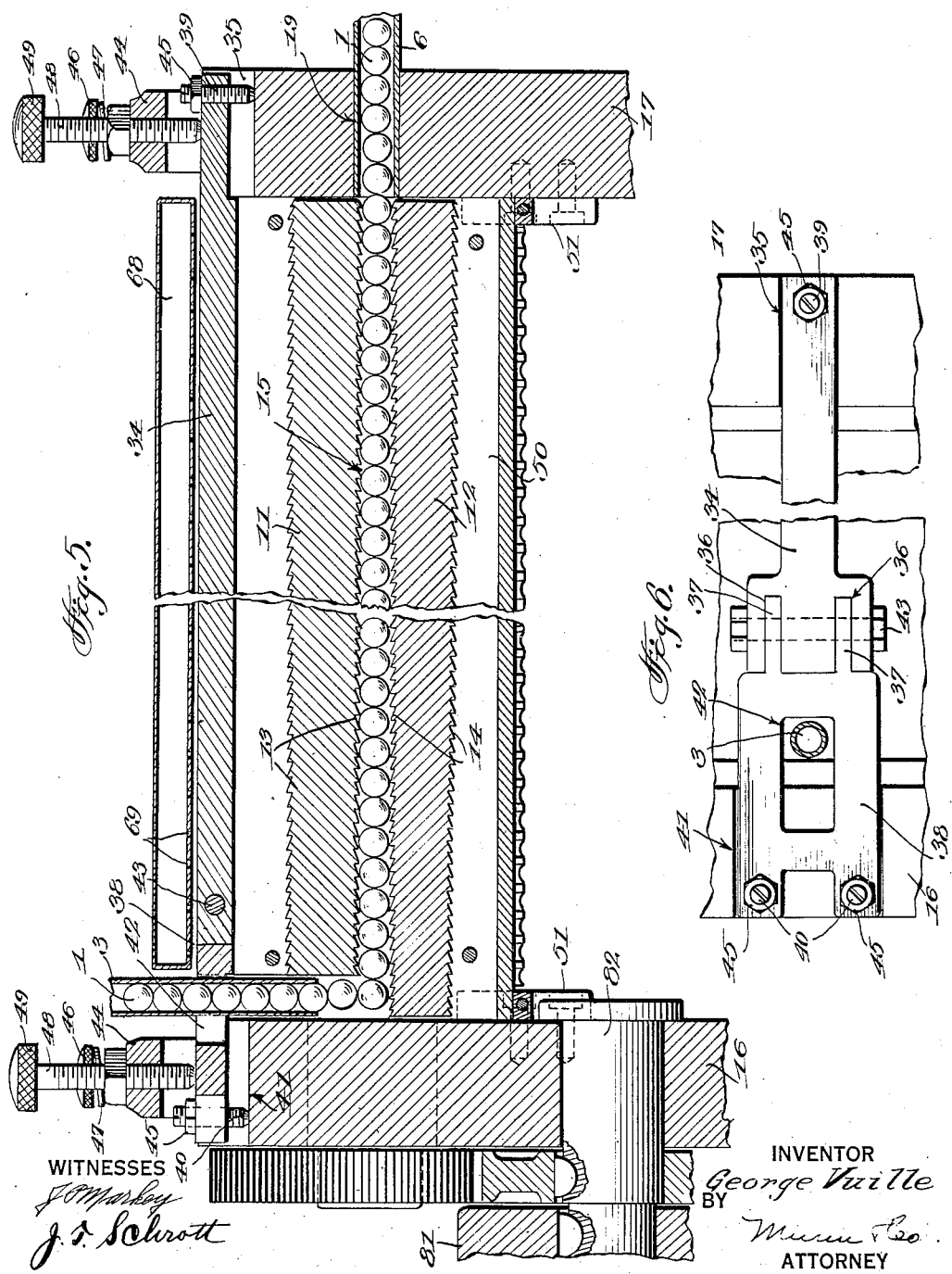

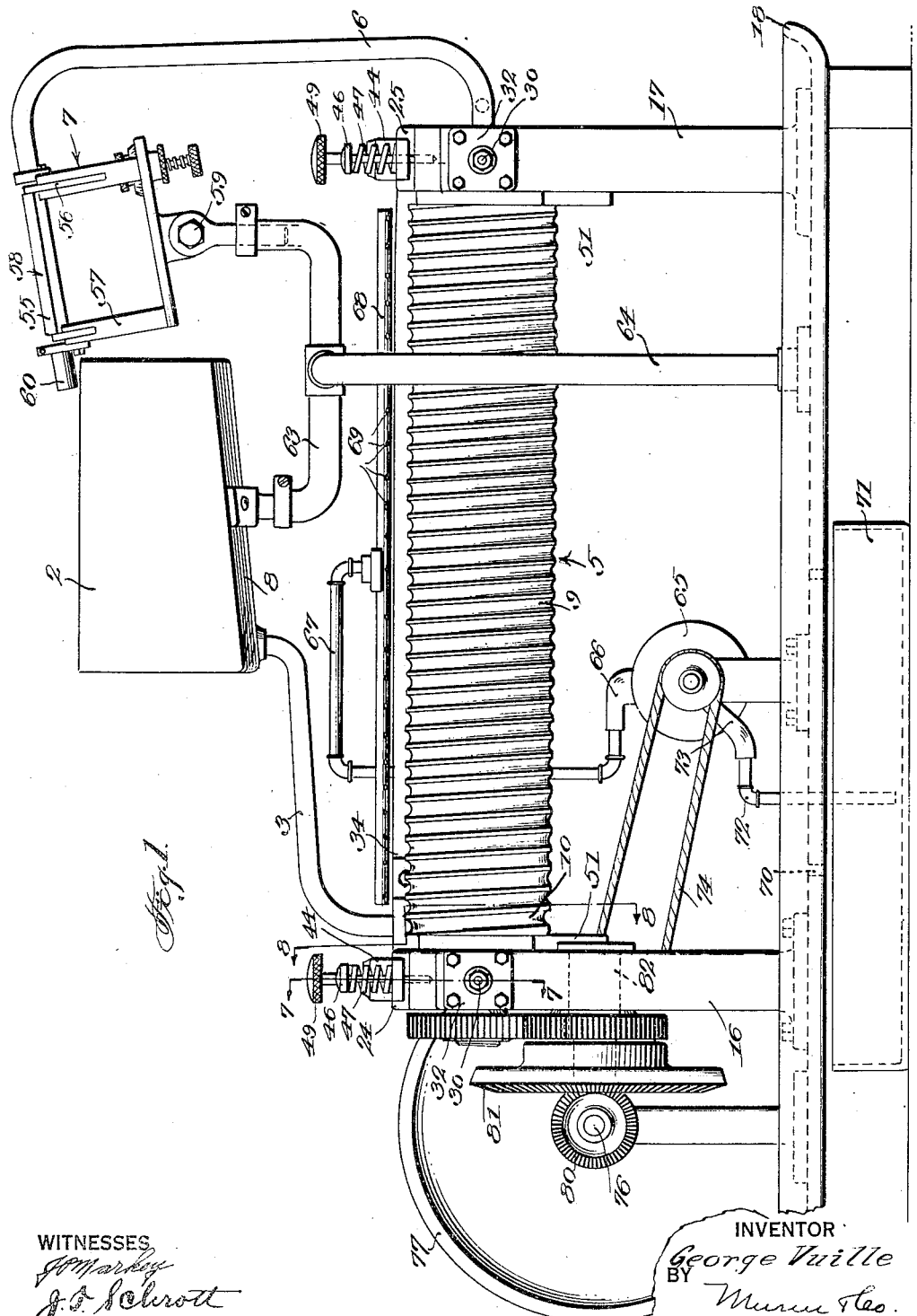

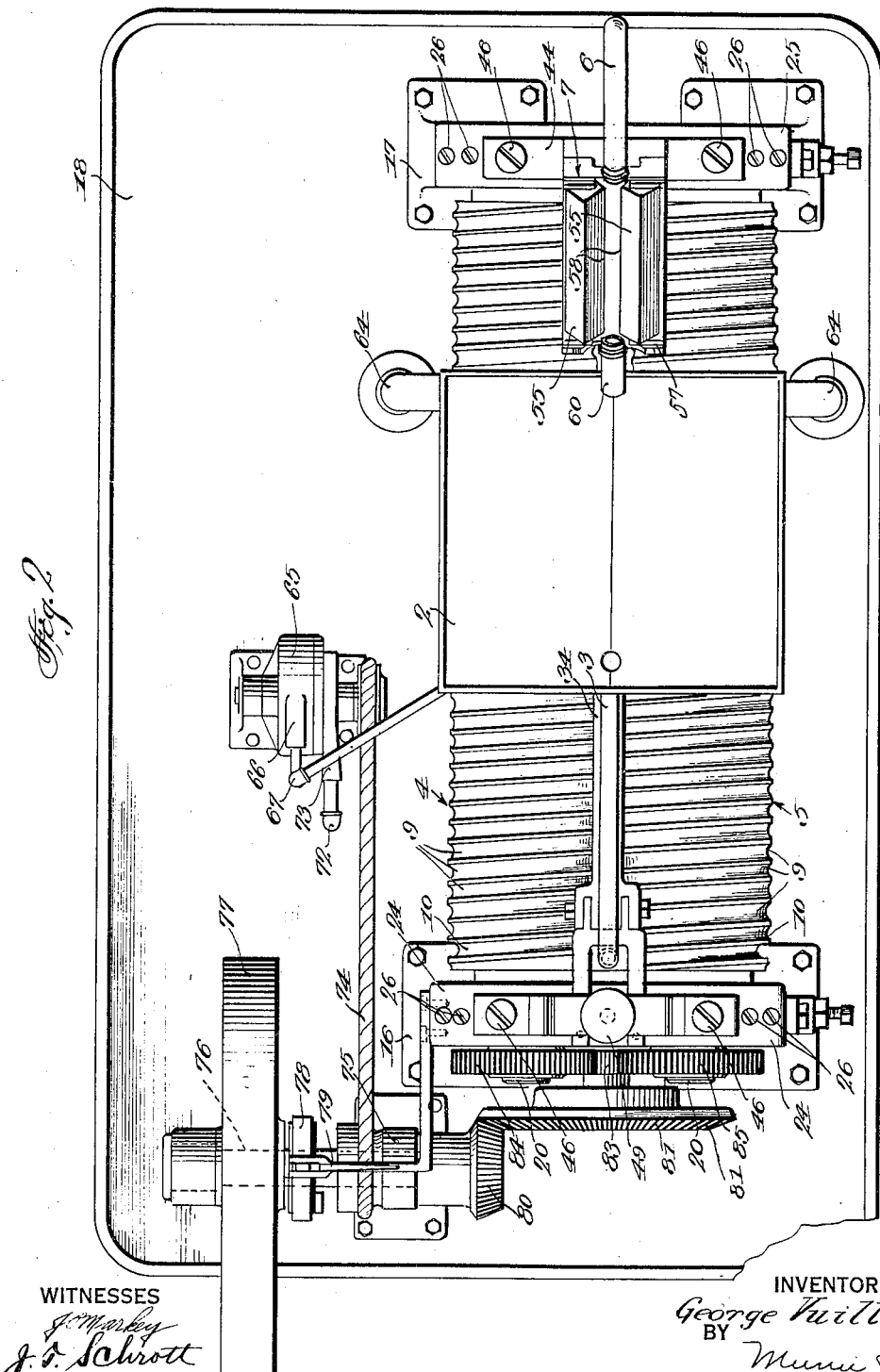

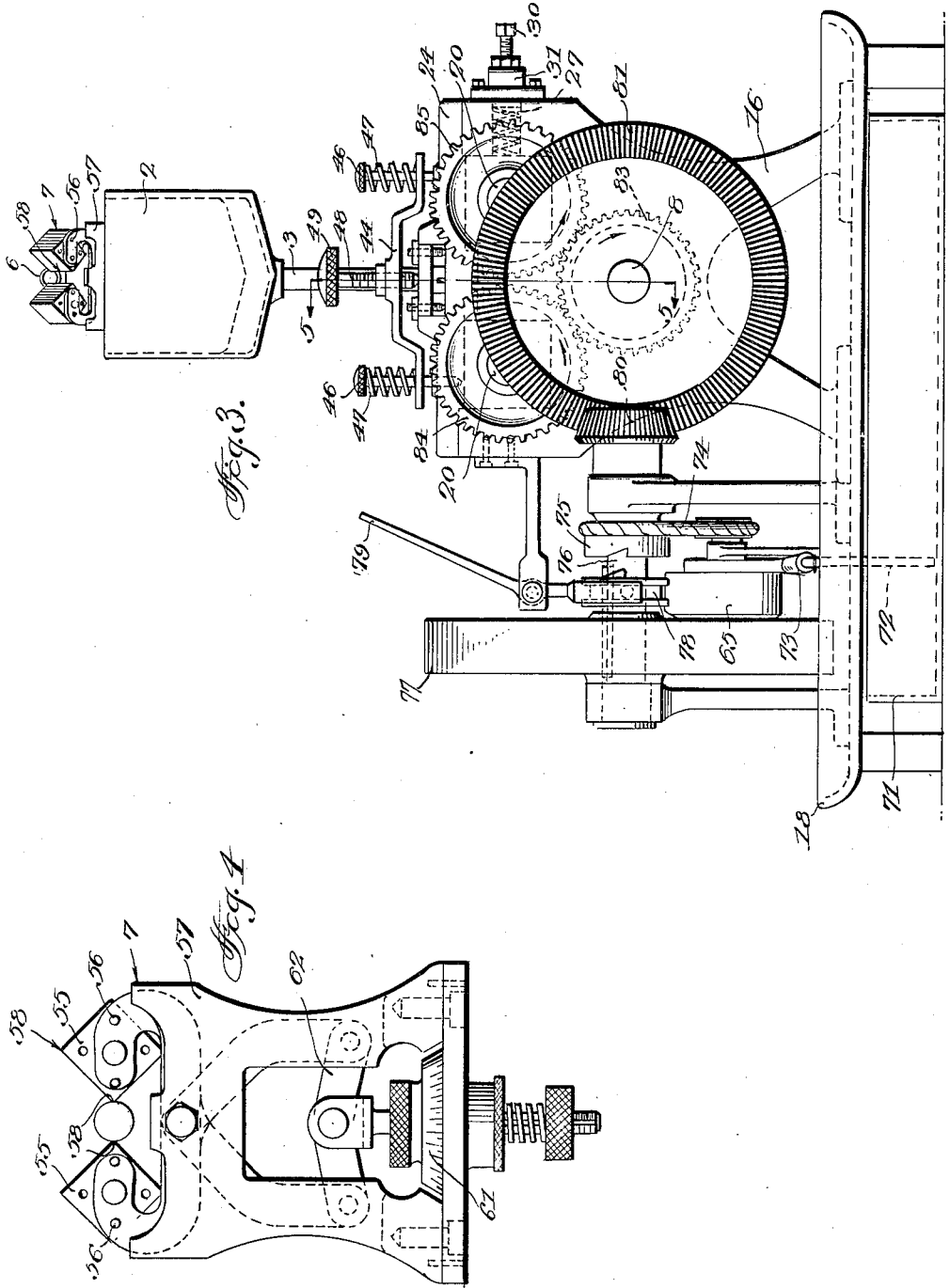

Dec. 8, 1931.  G. VUILLE  1,835,830
MACHINE FOR MILLING BEARING BALLS
Filed March 12, 1930   5 Sheets-Sheet 5
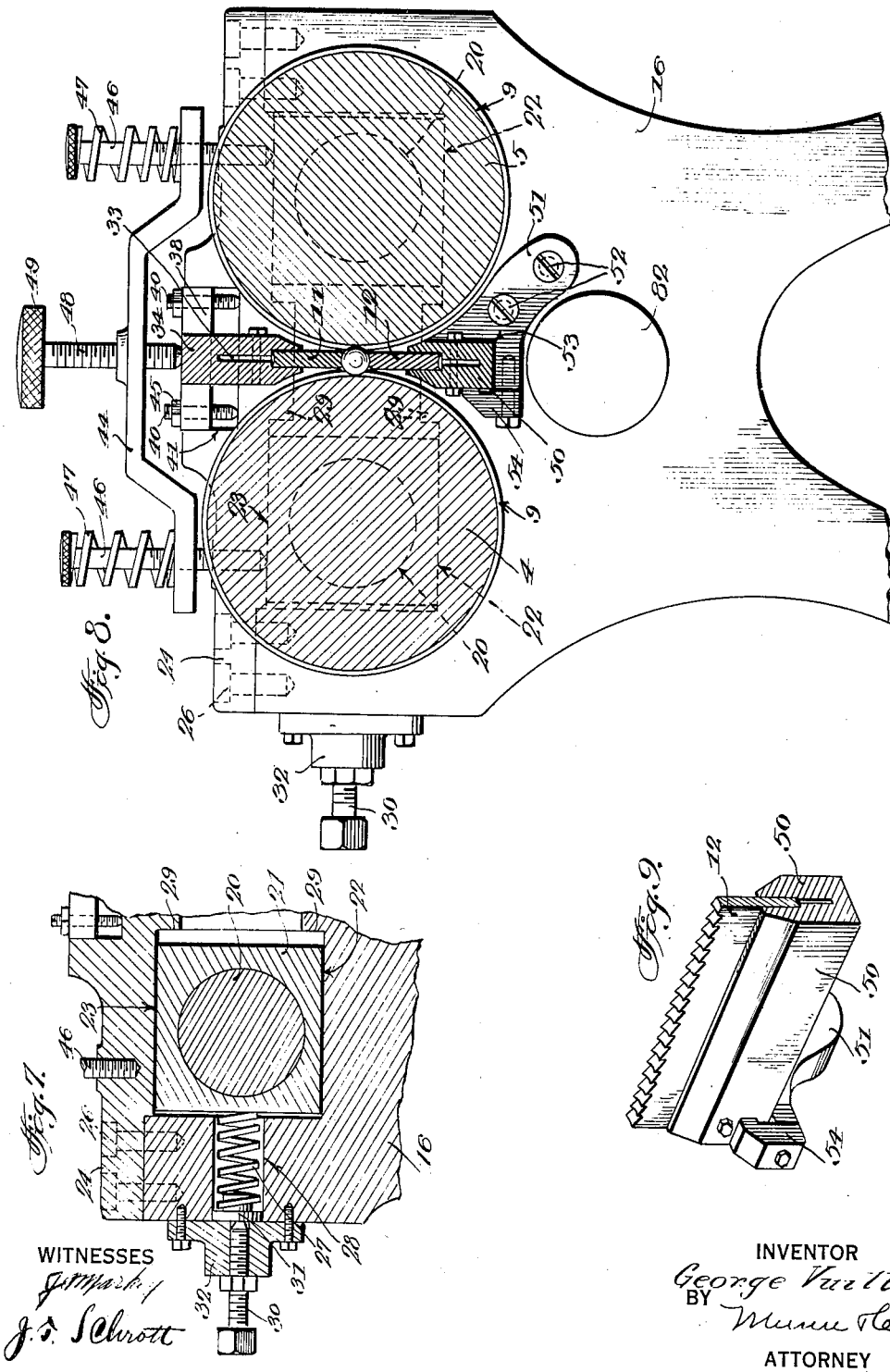
WITNESSES
INVENTOR
George Vuille
BY
ATTORNEY Patented Dec. 8, 1931

1,835,830

UNITED STATES PATENT OFFICE

GEORGE VUILLE, OF PLAINVILLE, CONNECTICUT

MACHINE FOR MILLING BEARING BALLS

Application filed March 12, 1930. Serial No. 435,272.

This invention relates to improvements in milling machines, its particular purpose being to mill comparatively rough ball stock until approximately perfect bearing balls of a predetermined size are turned out, and it consists of the constructions, combinations and arrangements herein described and claimed.

An object of the invention is to provide a machine in which a ball is forced to traverse a given circuit along a part of which mechanism for milling is located, until a bearing ball of the requisite diameter and finish s produced.

A further object of the invention is to provide a milling machine in which a gauge is one of the elements of the foregoing circuit, a double purpose of this gauge being to measure the balls at regular intervals and to discharge them from the circuit and machine when the proper diameter is arrived at.

A still further object of the invention is to provide a milling machine which is self-fed insofar as the supply to the conveyor rolls is concerned.

A still further object of the invention is to provide a milling machine which may be set for an accurate control of the size of the bearing balls, the advantage of this facility being that a ball cannot be milled smaller during passage between the double cutters after the requisite diameter is once arrived at.

Other objects and advantages will appear in the following specification, reference being had to the accompanying drawings in which Figure 1 is a side elevation of the improved milling machine.

Figure 2 is a plan view thereof.

Figure 3 is an elevation of the drive end of the machine.

Figure 4 is an end elevation of the ball gauge.

Figure 5 is a longitudinal section taken substantially on the line 5—5 of Figure 3.

Figure 6 is a detail plan view of the bridge by which the top cutter is supported, parts being shown in section.

Figure 7 is a detail sectional view taken on the line 7—7 of Figure 1.

Figure 8 is a section taken on the line 8—8 of Figure 1.

Figure 9 is a detail sectional perspective view of a portion of the bottom cutter and its mount.

As has been indicated already in the foregoing brief statements, it is one of the outstanding purposes of the machine to mill balls 1 (Fig. 5) from comparatively rough ball stock until practically perfect bearing balls are turned out. The milling operation is conducted along a circuit of which a hopper 2 (Fig. 1), feed pipe 3, conveyor rolls 4, 5 (Fig. 8), a discharge pipe 6 (Fig. 1) and a gauge 7 are sole constituents.

A quantity of the balls 1 while in the rough state is placed in the hopper 2 which has a sloping bottom 8 so that they roll by gravity toward and into the feed pipe 3. The balls are continuously forced through the foregoing circuit until they are milled to the proper size, whereupon they drop out of the circuit at the gauge 7 and are either taken or conducted to any point of disposal.

For the purpose of conveying the balls through the machine from end to end each of the rolls 4, 5 has a helical groove 9 of a cross sectional curvature substantially agreeing with the contour of the balls. The first thread 10 of these grooves (Figs. 1 and 2) is deeper than the others in the series, but after the first convolution immediately diminishes to the size of the rest. For example, if the groove 9 of each rolls is $\frac{7}{16}''$ deep the first thread 10 would be $\frac{1}{2}''$ deep.

This provision enables an easy and more ready accommodation of the rough balls to the top and bottom cutters 11, 12 (Fig. 8) and also has a tendency to avoid a sudden jar on the rolls 4, 5 as might occur if the initial extra depth of the grooves 9 were omitted.

As shown in Figure 8 the top and bottom cutters 11, 12 are situated between the rolls 4, 5 which are laterally spaced for the purpose. The cutters extend in the direction of the length of the machine (Fig. 5). They are toothed respectively at 13 and 14 on the opposite longitudinal edges for the purpose of doubling the period of use. The toothed surfaces are concaved to agree with the finished curvature of the balls and in practice will be very fine. When the confronting teeth 13, 14 (Figs. 5 and 8) are found to be excessively worn the cutters will be turned over to bring the other teeth into operation.

The confronting relationship of the edges of the cutters 11, 12 as well as the side faces of the rolls 4, 5 define a ball channel 15 (Fig. 5) through which the balls 1 are forced until they are reduced to the required size. The purpose of the helical grooves 9 is to continuously rotate the balls 1 in the lateral direction and at the same time convey them longitudinally so that the cutters 11, 12 perform a continuous milling operation in the two directions.

The feed pipe 3 (Fig. 1) extends well down into the machine in order to insure the proper delivery of the balls 1 to the channel 15 (Fig. 5) for which purpose the cutter 11 is made shorter than the cutter 12. The latter is substantially co-extensive with the rolls 4, 5 as well as the distance between the end heads 16, 17 of a base 18 upon which the working parts have their support. A bore 19 (Fig. 5) in the head 17 receives the discharge pipe 6. This extends to the inner surface of the end head and is a continuation of the ball channel 15.

Each of the rolls 4, 5 has trunnions 20 on its opposite ends (Figs. 7 and 8) for the purpose of furnishing a bearing, to which end blocks 21 are provided to receive them.

The bearing block 21, using the illustration in Figure 7 for example, is slidably seated in a recess defined by a depression 22 in the head and a depression 23 in a cover 24. There is a somewhat similar cover 25 (Figs. 1 and 2) on the head 17 at the opposite end of the machine.

Machine screws 26 or their equivalents secure the covers 24, 25 to the heads 16, 17 (Fig. 2). A spring 27 in a bore 28 on one side of each end head 16, 17 (for example Figs. 3, 7 and 8) bears against the adjoining edge of the bearing block 21 and tends to force it over to the center of the machine. Stops 29 limit the motion in that direction. A screw stud 30 bears against a plug 31 against which the other end of the spring rests in the bore 28. The stud is carried by a mount 32 and is adjustable in respect thereto so as to vary the tension of the spring 27.

Lateral yielding of the roll 4 (Fig. 8) becomes possible by virtue of the resilient mounting of the two bearing blocks 21 (Fig 7). Although there will be a substantial uniformity in the size of the balls 1 yet when these are first introduced into the machine at the feed pipe 3 they will be sufficiently rough to require the yielding quality of the rolls 4 which the resilient mounting of the blocks 21 affords.

There is a similar provision respecting the cutters 11, 12. The cutter 11 is rigidly clamped in a slot 33 in a depending portion of a bridge 34 which extends from a slot 35 in the end head 17 (Figs. 5 and 6) to a point adjacent to the end head 16 where it is bifurcated at 36 (Fig. 6) to receive the prongs 37 of a bridge extension 38. The members 34, 38 may have the common designation bridge because it is from the two that the top cutter 11 is suspended.

Screw studs 39, 40, respectively over the end heads 17 and 16, provide stops for the bridge in the slots 35 and 41 of the respective heads. The studs have screw driver slots for their adjustment and jam nuts 45 by which to set the adjustments. An opening 42 (Figs. 5 and 6) in the bridge extension 38 permits passage through of the feed pipe 3. The presence of the feed pipe makes it necessary to bifurcate the left end of the extension 38 so that two of the studs 40 must be furnished rather than one as in the instance of 39 at the right end.

It would be possible to make the bridge 34 continuous at the left end, that is to say, make it in one piece so as to avoid the extra extension 38. However, from a manufacturing standpoint it was found better to make the bridge in the two parts. The bifurcations 36 and prongs 37 are firmly secured by a bolt and nut, commonly designated 43, (Fig. 6).

Straps 44 are movably carried and guided by headed pins 46 which are fixedly screwed or otherwise secured on the covers 24, 25. Springs 47 bear against the heads and upon the straps with degrees of tension that are varied by the setting of adjustment screws 48. These screws have knurled heads 49 with which to turn them, and the points bear on the bridge. It is thus that the top cutter 11 is resiliently mounted.

The bottom cutter 12 is carried by a slotted mounting 50 (Figs. 5, 8 and 9) which at its ends has brackets 51 fixedly mounted at 52 (Fig. 8) to the insides of the heads 16, 17. The brackets 51 are not parts of the mounting 50 but rather have angled recesses 53 (Fig. 8) in which the mounting 50 is set. Clamp pieces 54 (Figs. 8 and 9) applied later, secure the mounting 50 and at the same time make it possible to remove the mounting when it becomes necessary to replace the cutter 12.

Thus far it will be understood that the series of balls 1 (Fig. 5) has yielding opposition on three sides. The rolls 4, 5 are subject to lateral expansion, so to speak, while the top cutter 11 may yield in the upward direction. The diametrical size of the balls turned out is determined by the setting of the studs 39, 40 (Fig. 5) since it is obvious that the balls can be milled no smaller than the vertical distance of the channel 15, limited by the engagement of these studs with the bases of the slots 35, 41. On the other hand, oversize balls will not be turned out because a given ball will be made to traverse the circuit until it is released by the gauge 7. This gauge may be made in any one of a variety of ways but the construction selected for illustration is as follows:—

A pair of bars 55 (Figs. 1, 2, 3 and 4) is suitably mounted upon supports 56 at the opposite ends of a frame 57 which, in practice, may be enclosed or in any other way made the point of reception of the perfected balls. For the latter purpose the bars 55 are cross sectionally shaped to provide a plurality of knife edges 58 (Fig. 4).

These knife edges are intended to be set in confronting relationship. The adjoining upper surface of the bars 55 define a trough into which the pipe 6 discharges the balls 1. The gauge 7 is adjustably mounted at 59 (Fig. 1) for any desired inclination so that the balls 1 are compelled to roll down the bars 55 which do the gauging during the act of rolling. If the balls are the proper size they will drop through, and if they are not then they will be discharged at a spout 60 (Fig. 1) into the hopper 2 for another passage through the circuit.

The adjustment of the gauge 7 is one factor in regulation of the speed of operation of the machine. The inclination at which the gauge 7 is adjusted will determine the rate at which the balls are re-entered in the circuit. Should the setting of the bars 55 be rather steep the balls will roll through the gauge 7 faster than if they were placed more nearly horizontal.

The distance at which the confronting knife edges 58 are set apart is regulated by a micrometer 61 (Fig. 4) which by means of toggles 62 acts upon the supports 56 by which the bars 55 are carried. It is readily seen that manipulation of the micrometer will set the spacing of the bars, hence gauge the diameter of the balls intended to be delivered by the machine.

A bracket 63 (Fig. 1) provides a common support for the gauge 7 and hopper 2. This bracket is carried by posts 64 (Fig. 2) which rise from the base 18. This base is made in the shape of a shallow pan, the edges being turned up so as to catch a cutting compound which is circulated between the cutters and rolls by a pump 65 (Fig. 1).

The outlet 66 of this pump connects by means of a pipe 67 with a tube 68 which extends lengthwise over the bridge 34 (Fig. 5) and has perforations 69 at which the solution is discharged. After passing through the machine the solution is caught by the shallow pan whence it runs through an opening 70 (Fig. 1) into a tank 71 somewhere beneath the base, usually on the floor. A suction pipe 72 conducts the solution from the tank 71 to the inlet 73 of the pump when the latter is in operation.

Driving power for the pump 65 is transmitted by a belt 74 from a clutch pulley 75 loose on a shaft 76. This shaft has a wheel 77 adapted to be driven by an engine. It has a clutch 78 (Fig. 3) splined thereto and slidable by a lever 79 so that the pump 65 may be connected or disconnected as requirements for the cutting compound in conjunction with the cutters 11, 12 may vary.

A pinion 80 on the inner end of the shaft 76 drive a gear 81 keyed upon a shaft 82 (Fig. 5) in common with a roll driver 83 (Fig. 3). This driver meshes with gears 84, 85 on the appropriately extended trunnions 20 of the rolls 4, 5 so that the latter are rotated in the direction of the arrows in Figure 3.

The operation is readily understood. The hopper 2 is filled with a quantity of bearing balls in a comparatively rough state. These gravitate to the feed pipe 3 by virtue of the sloping bottom 8. The balls assemble in a single row or series between the point of departure from the hopper 2 to the point of discharge at the gauge 7, or to the spout 60 (Fig. 1) in case the balls have not been milled to the requisite size to enable dropping through between the bars 55 (Fig. 4).

Upon setting the wheel 77 to turning the rolls 4, 5 (Figs. 2 and 8) will be rotated in the direction indicated by the arrows in Figure 3. The helical grooves 9 confront each other so as to contain a ball 1 between pairs of confronting threads. The balls are thus conveyed through in a series (Fig. 5), and as they are so conveyed they are simultaneously turned so that every part will be acted upon by the teeth of the top and bottom cutters 11, 12.

These teeth are laterally concaved, the general effect of the ball channel 15 (Fig. 5) being a recess in which the series of balls fits. Necessary pressure is brought to bear upon the balls through the medium of springs 27 (Fig. 7) as well as springs 47 (Fig. 8). The former act upon the bearing blocks 21 of one of the conveyor rolls, for instance 4, while the latter act upon the bridge 34 which carries the top cutter 11. In addition to supplying the necessary pressure these springs also enable certain necessary yielding of these parts in case there should be some roughness on some of the balls that might tend to add complications to the operation.

The size of the balls 1 is controlled by the screw studs 39, 40 (Figs. 5 and 8). These limit the distance to which the springs 47 may press the top cutter 11 into the channel 15. In other words they determine the vertical dimension between the confronting cutters 11, 12. The milling operation upon the series of balls 1 (Fig. 5) will be performed continuously while within range of the cutters in the channel 15 until the diameters equal the aforesaid vertical dimension.

It will be impossible to mill the balls smaller than a given dimension to which the cutter 11 may be set by the screw studs 39, 40. Therefore, should a considerable over-size ball find its way into the series (Fig. 5) it would spread the cutters by virtue of raising the cutter 11 against the tension of the spring 47 and thus suspend the milling operation on the remaining balls until the over-size ball is reduced to the size of the rest.

The result of these provisions is a uniform product. Only perfected balls will drop out of the prescribed path when reaching the gauge 7. This gauge is set by the micrometer 61 (Fig. 4) and as the balls reach the gauge and bars 55 they will drop through only in case the diameter has been milled down to the micrometer setting.

The cutting compound can be circulated at will. The mere shifting of the lever 79 (Fig. 3) will start or stop the pump 65 (Fig. 1) which, when in operation, will flood the channel 15 (Fig. 5) with the solution so as to facilitate the milling operation.

It has been previously pointed out that the first thread 10 of each conveyor roll is of extra depth. This initiates the balls to better advantage. They act to take the balls more readily and line them up in the horizontal series.

While the construction and arrangement of the improved milling machine for ball bearings is that of a generally preferred form, obviously modifications and changes may be made without departing from the spirit of the invention or the scope of the claims.

I claim:—

1. A milling machine comprising a pair of confronting cutters, a pair of revoluble rolls having helical conveyor grooves, said cutters and rolls being so spaced as to define a central ball channel, and means for supplying one end of the channel with balls to be milled by the cutters.

2. A milling machine comprising a pair of confronting cutters, a pair of revoluble rolls having helical conveyor grooves, said cutters and rolls being so spaced as to define a central ball channel, means for supplying one end of the channel with balls to be milled by the cutters, and a gauge upon which the balls are discharged from the other end of the channel, said gauge having means either for discarding perfected balls or retaining imperfect balls for re-introduction at the first end of the channel.

3. A milling machine comprising a pair of cutters having confronting concaved teeth, a pair of revoluble rolls having confronting concaved helical grooves, the concavity of the teeth and grooves defining a ball channel, means for supplying balls to one end of the channel for conduction along the cutters by action of the grooves, and means at the other end of the channel for causing a separation of perfected and imperfected balls.

4. A milling machine comprising a pair of spirally grooved conveyor rolls spaced in one direction, a pair of cutters situated between the rolls and spaced in the other direction to define a ball channel with the confronting faces of said rolls, and means to adjust the position of one of the cutters thus to fix the diameter to which the balls may be milled.

5. A milling machine comprising a pair of spirally grooved conveyor rolls spaced in one direction, a pair of cutters situated between the rolls and spaced in the other direction to define a ball channel with the confronting faces of said rolls, means to adjust the position of one of the cutters thus to fix the diameter to which the balls may be milled, and means for yieldably supporting one of the rolls to compensate for variations in the sizes of balls.

6. A milling machine comprising a pair of spirally grooved conveyor rolls spaced in one direction, a pair of cutters situated between the rolls and spaced in the other direction to define a ball channel with the confronting faces of said rolls, means to adjust the position of one of the cutters thus to fix the diameter to which the balls may be milled, and separate means for yieldably supporting one of the rolls and said one cutter to compensate for variations in the size of balls.

7. A milling machine comprising a pair of conveyor rolls spaced in one direction, a pair of cutters situated between the rolls and spaced in a right angular direction from said first mentioned direction, a bridge by which one of the cutters is carried, screw studs carried by the bridge, and heads by which the rolls and the other cutter are supported, in reference to which the studs are adjustable to fix the position of the bridge, hence of the cutter carried thereby.

8. A milling machine comprising a pair of end heads, a pair of horizontally spaced, helically grooved conveyor rolls revolubly supported by said heads, a pipe for feeding balls to the rolls at a point adjoining one of the heads, and a pair of cutters situated between the rolls, being vertically spaced to complete a ball channel, one of the cutters being shorter than the other to provide an entrance for the pipe.

9. A milling machine comprising a pair of cutters vertically spaced to define part of a ball channel, means to feed balls to one end of the channel, and a pair of revoluble rolls horizontally spaced to complete the channel, said rolls having confronting helical conveyor grooves which are deepest at the feed end.

10. A milling machine comprising a pair of rolls having confronting helical grooves for conveying balls along a prescribed path, cutters situated between the rolls defining with said grooves a channel which is traversible by the balls for a milling operation, a pump for discharging a cutting compound above the rolls for the flooding of the cutters, and means for simultaneously revolving the rolls and operating the pump.

11. In a milling machine, a cutter, a mounting by which the cutter is clamped, brackets having an angled recess in which the mounting is received, and clamp pieces attachable to and removable from the brackets respectively for holding and removing the mounting and cutter.

12. A milling machine comprising stationary milling means, a pair of revoluble rolls, said milling means and rolls being so spaced as to define a ball channel, and means for supplying one end of the channel with balls, said rolls having helical grooves to advance the balls relatively to said milling means.

GEORGE VUILLE.